(12) United States Patent
Quioc et al.

(10) Patent No.: US 7,237,801 B2
(45) Date of Patent: Jul. 3, 2007

(54) GAS GENERATING SYSTEM

(75) Inventors: Eduardo L. Quioc, Westland, MI (US); David S. Whang, Bloomfield Hills, MI (US); Paresh S. Khandhadia, Troy, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 2 days.

(21) Appl. No.: 11/215,616

(22) Filed: Aug. 30, 2005

(65) Prior Publication Data

US 2006/0043716 A1     Mar. 2, 2006

Related U.S. Application Data

(60) Provisional application No. 60/606,323, filed on Aug. 31, 2004.

(51) Int. Cl.
    *B60R 21/26* (2006.01)
(52) U.S. Cl. .................. 280/736; 280/741; 280/742; 55/446; 55/445
(58) Field of Classification Search .......... 280/741, 280/736, 742, 740; 102/530, 531; 422/164, 422/167; 55/440, 446, 445
    See application file for complete search history.

(56) References Cited

U.S. PATENT DOCUMENTS 2,891,525 A     6/1959   Moore .................. 123/90.51

(Continued)

FOREIGN PATENT DOCUMENTS

DE          40 19 877 A1    6/1990

(Continued)

OTHER PUBLICATIONS

WO 98/39183; Title: Multi-Chamber Inflator; International Publication Date: Sep. 11, 1998; Inventors: Shahid A. Siddiqui and Rickey Lee Stratton; Applicant; Automotive Systems Laboratory, Inc.

*Primary Examiner*—Ruth Ilan
(74) *Attorney, Agent, or Firm*—L.C. Begin & Associates, PLLC (57) ABSTRACT

A gas generating system (10) includes a tubular outer housing (12) having a longitudinal axis (L) and one or more apertures (12*d*) formed therealong to enable fluid communication between an interior of the outer housing and an exterior of the outer housing. A tubular inner housing (70) is positioned within the interior of the outer housing (12). The inner housing (70) includes one or more apertures (70*d*) formed therealong to enable fluid communication between an interior of the inner housing and an exterior of the inner housing. A first tubular baffle (80) is provided for cooling and regulating a flow of gas produced by the gas generating system (10). The first baffle (80) has a plurality of corrugations (80*c*) formed therealong and is positioned between the inner housing (70) and the outer housing (12) to define a gas flow channel (82) extending between the first baffle (80) and the inner housing (70). The first baffle also includes an opening (80*e*) formed therein to enable fluid communication between the gas flow channel (82) and an exterior of the gas flow channel. The corrugations (80*c*) are spaced apart from the inner housing (70) to provide a corresponding plurality of constricted gas flow passages (84) extending between the corrugations (80*c*) and the inner housing (70). The constricted passages (84) provide alternating compression and expansion of gases flowing along the gas flow channel (82), thereby facilitating cooling and filtration of the gases.

20 Claims, 4 Drawing Sheets

U.S. PATENT DOCUMENTS

| | | | |
|---|---|---|---|
| 3,794,347 A | 2/1974 | Zens | 280/150 |
| 3,880,447 A * | 4/1975 | Thorn et al. | 280/740 |
| 3,958,949 A | 5/1976 | Plantif et al. | |
| 3,985,076 A * | 10/1976 | Schneiter et al. | 102/531 |
| 4,001,750 A | 1/1977 | Scherer et al. | 337/280 |
| 4,012,189 A | 3/1977 | Vogt et al. | 431/353 |
| 4,215,631 A | 8/1980 | Rucker | 102/27 |
| 4,530,516 A | 7/1985 | Adams et al. | 280/741 |
| 4,611,374 A | 9/1986 | Schnelle et al. | 29/890.13 |
| 4,730,558 A | 3/1988 | Florin et al. | 102/218 |
| 4,762,067 A | 8/1988 | Barker et al. | 102/313 |
| 4,950,458 A | 8/1990 | Cunningham | 422/164 |
| 5,028,070 A * | 7/1991 | Bender | 280/741 |
| 5,048,862 A | 9/1991 | Bender et al. | |
| 5,318,323 A * | 6/1994 | Pietz | 280/736 |
| 5,333,656 A | 8/1994 | Mackal | 141/330 |
| 5,372,449 A | 12/1994 | Bauer et al. | 403/273 |
| 5,387,009 A | 2/1995 | Lauritzen et al. | |
| 5,443,286 A | 8/1995 | Cunningham et al. | |
| 5,509,686 A | 4/1996 | Shepherd et al. | 280/738 |
| 5,516,147 A | 5/1996 | Clark et al. | 280/737 |
| 5,533,751 A | 7/1996 | Kort et al. | 280/737 |
| 5,562,304 A * | 10/1996 | Gest | 280/740 |
| 5,564,743 A | 10/1996 | Marchant | 280/741 |
| 5,582,427 A | 12/1996 | Rink et al. | 280/740 |
| 5,588,676 A | 12/1996 | Clark et al. | 280/741 |
| 5,611,566 A | 3/1997 | Simon et al. | 280/736 |
| 5,613,703 A | 3/1997 | Fischer | 280/741 |
| 5,622,380 A | 4/1997 | Khandhadia et al. | 280/736 |
| 5,624,133 A * | 4/1997 | Wong | 280/740 |
| 5,628,528 A | 5/1997 | DeSautelle et al. | 280/736 |
| 5,630,619 A | 5/1997 | Buchanan et al. | 280/741 |
| 5,662,722 A | 9/1997 | Shiban | 55/413 |
| 5,725,245 A * | 3/1998 | O'Driscoll et al. | 280/740 |
| 5,799,973 A | 9/1998 | Bauer et al. | 280/741 |
| 5,845,935 A | 12/1998 | Enders et al. | 280/743.2 |
| 5,860,672 A | 1/1999 | Petersen | 280/728.2 |
| 5,872,329 A | 2/1999 | Burns et al. | 149/36 |
| 5,934,705 A | 8/1999 | Siddiqui et al. | 280/736 |
| 5,941,562 A | 8/1999 | Rink et al. | 280/741 |
| 5,970,880 A | 10/1999 | Perotto | 102/531 |
| 6,019,389 A | 2/2000 | Burgi et al. | 280/736 |
| 6,032,979 A | 3/2000 | Mossi et al. | 280/741 |
| 6,095,556 A | 8/2000 | Bailey et al. | 280/737 |
| 6,095,561 A | 8/2000 | Siddiqui et al. | 280/472 |
| 6,106,000 A | 8/2000 | Stewart | 280/728.2 |
| 6,116,491 A | 9/2000 | Katoh | 228/42 |
| 6,149,193 A | 11/2000 | Canterberry et al. | 280/741 |
| 6,210,505 B1 | 4/2001 | Khandhadia et al. | 149/36 |
| 6,244,623 B1 | 6/2001 | Moore et al. | 280/741 |
| 6,464,254 B2 | 10/2002 | Chikaraishi et al. | 280/741 |
| 6,776,434 B2 | 8/2004 | Ford et al. | 280/729 |
| 6,908,104 B2 | 6/2005 | Canterbery et al. | 280/736 |
| 6,935,655 B2 | 8/2005 | Longhurst et al. | 280/736 |
| 6,976,702 B2 | 12/2005 | Yokota et al. | 280/730.2 |
| 7,073,820 B2 | 7/2006 | McCormick | 280/741 |
| 2003/0155757 A1 * | 8/2003 | Larsen et al. | 280/741 |
| 2003/0201628 A1 | 10/2003 | Choudhury et al. | 280/729 |
| 2005/0001414 A1 | 1/2005 | Matsuda et al. | 280/736 |
| 2005/0134031 A1 | 6/2005 | McCormick | |
| 2005/0161925 A1 | 7/2005 | Blackburn | 280/741 |
| 2005/0194772 A1 | 9/2005 | Numoto et al. | 280/741 |
| 2005/0230949 A1 | 10/2005 | Blackburn | |
| 2005/0263993 A1 | 12/2005 | Blackburn | |
| 2005/0263994 A1 | 12/2005 | Quioc | |
| 2005/0280252 A1 | 12/2005 | McCormick | |
| 2006/0005734 A1 | 1/2006 | McCormick | |
| 2006/0043716 A1 | 3/2006 | Quioc | |
| 2006/0082112 A1 | 4/2006 | Blackburn | 280/736 |

FOREIGN PATENT DOCUMENTS

| | | |
|---|---|---|
| DE | 42 27 547 A1 | 2/1994 |
| EP | 0602785 B1 | 10/1993 |
| EP | 0728633 A1 | 2/1996 |
| EP | 0844149 A1 | 11/1997 |
| EP | 0 864 470 A1 | 9/1998 |
| EP | 1122134 B1 | 7/2000 |
| EP | 1308353 A2 | 9/2002 |
| JP | 05096147 | 4/1993 |
| WO | WO 98/39183 | 9/1998 |
| WO | WO 2004/091982 A1 | 10/2004 |
| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

* cited by examiner

GAS GENERATING SYSTEM

CROSS REFERENCE TO RELATED APPLICATIONS

This application claims the benefit of provisional application Ser. No. 60/606,323, filed on Aug. 31, 2004.

BACKGROUND OF THE INVENTION

The present invention relates generally to gas generating systems and, more particularly, to filterless gas generating systems usable in applications such as inflatable occupant restraint systems in motor vehicles.

Installation of inflatable occupant protection systems, generally including airbag systems, as standard equipment in all new vehicles has intensified the search for smaller, lighter and less expensive vehicle occupant protection systems. Accordingly, since the inflation gas generating system used in such protection systems tends to be the heaviest and most expensive component, there is a need for a lighter and less expensive gas generating system.

A typical gas generating system includes cylindrical steel or aluminum housing having a diameter and length related to the vehicle application and characteristics of a gas generant composition contained therein. Inhalation by a vehicle occupant of particulates generated by gas generant combustion during airbag activation can be hazardous. Thus, the gas generating system is generally provided with an internal or external filter comprising one or more layers of steel screen of varying mesh and wire diameter. Gas produced upon combustion of the gas generant passes through the filter before exiting the gas generating system. Particulate material, or slag, produced during combustion of the gas generant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated airbag. However, inclusion of the filter in the gas generating system increases the complexity, weight, and expense of the gas generating system. While various gas generant formulations have been developed in which the particulates resulting from combustion of the gas generant are substantially eliminated or significantly reduced, certain types of gas generants are still desirable notwithstanding the relatively high percentage of combustion solids they produce, given favorable characteristics of these gas generants such as burn rate, sustained combustion, and repeatability of performance. Other ongoing concerns with gas generating systems include the need to increase manufacturing efficiency and the need to reduce manufacturing costs.

SUMMARY OF THE INVENTION

The present invention provides a gas generating system including a tubular outer housing having a longitudinal axis and one or more apertures formed therealong to enable fluid communication between an interior of the outer housing and an exterior of the outer housing. A tubular inner housing is positioned within the interior of the outer housing. The inner housing includes one or more apertures formed therealong to enable fluid communication between an interior of the inner housing and an exterior of the inner housing. A first tubular baffle is provided for cooling and regulating a flow of gas produced by the gas generating system. The first baffle has a plurality of corrugations formed therealong and is positioned between the inner housing and the outer housing to define a gas flow channel extending between the first baffle and the inner housing. The first baffle also includes an opening formed therein to enable fluid communication between the gas flow channel and an exterior of the gas flow channel. The corrugations are spaced apart from the inner housing to provide a corresponding plurality of constricted gas flow passages extending between the corrugations and the inner housing. The constricted passages provide alternating compression and expansion of gases flowing along the gas flow channel, thereby facilitating cooling and filtration of the gases.

DETAILED DESCRIPTION

Figure 1:
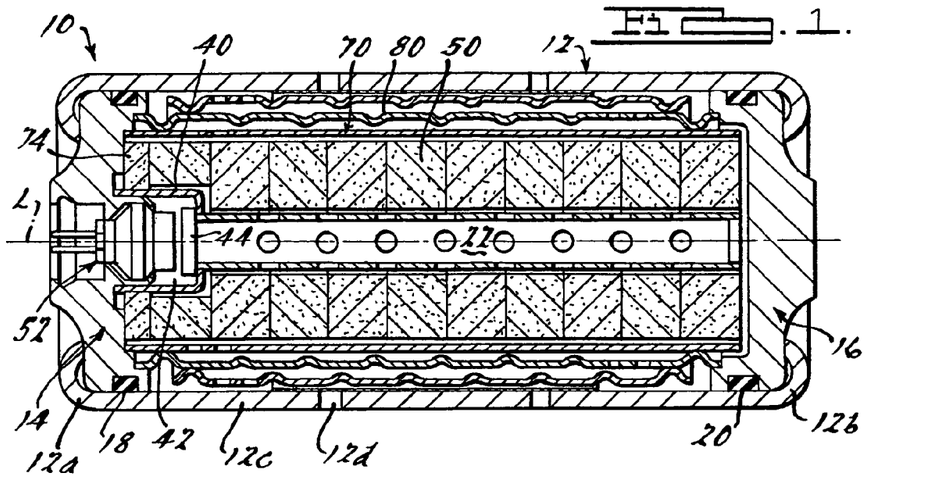
FIG. 1 is a cross-sectional side view of an embodiment of a gas generating system in accordance with the present invention.

FIG. 1 shows one embodiment of a gas generating system 10 in accordance with the present invention. Gas generating system 10 includes a tubular outer housing 12 having a longitudinal axis L, a pair of opposed ends 12a, 12b and a wall 12c extending between the ends to define a housing interior cavity. A plurality of gas exit apertures 12d is formed along housing wall 12c to enable fluid communication between an interior of outer housing 12 and an exterior of the outer housing. Outer housing 12 is made from a metal or metal alloy and may be a cast, drawn, extruded, or otherwise metal-formed.

A first end closure 14 is secured to end 12a of outer housing 12, and a second end closure 16 is secured to an opposite end 12b of outer housing 12 using one or more known methods. In the embodiment shown in FIG. 1, ends 12a and 12b of outer housing 12 are crimped over portions of first and second end closures 14, 16 to secure the end closures to the housing.

Figures 2, 3:
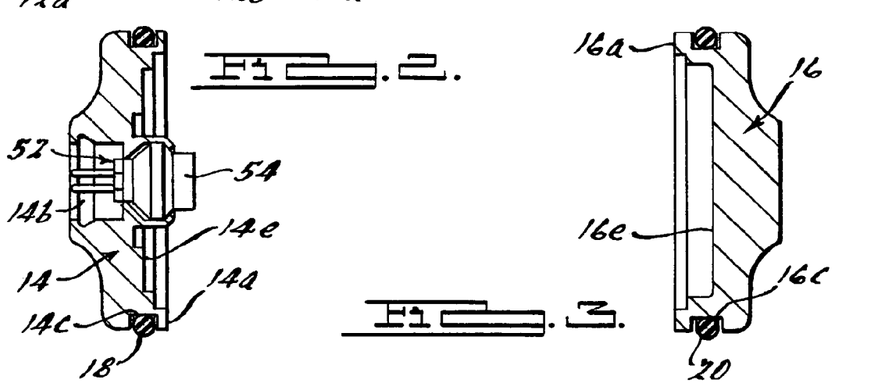
FIGS. 2 and 3 are cross-sectional side views of end closures incorporated into the gas generating system of FIG. 1.

Referring to FIGS. 1 and 2, first end closure 14 has formed therealong a peripheral shoulder 14a defining a recessed central area 14e therein, a central orifice 14b, and a peripheral cavity 14c. Peripheral shoulder 14a is formed along a face of the end closure and is dimensioned so that end portions of an inner housing 70 and a first baffle 80 (FIG. 1, both described in greater detail below) may be seated along recessed central area 14e, thereby suspending inner housing 70 and first baffle 80 radially inward of housing wall 12c. An O-ring or seal 18 is positioned in peripheral cavity 14c to seal the interface between first end closure 14 and housing wall 12c. End closure 14 may be stamped, die cast, or otherwise metal formed and may be made from carbon steel or stainless steel, for example.

Referring to FIGS. 1 and 3, second end closure 16 has formed therealong a peripheral shoulder 16a defining a recessed central area 16e therein, and a peripheral cavity 16c. Peripheral shoulder 16a is formed along a face of the end closure and is dimensioned so that end portions of inner housing 70 and first baffle 80 may be seated along recessed central area 16e, thereby suspending inner housing 70 and first baffle 80 radially inward of housing wall 12c. An O-ring or seal 20 is positioned in peripheral cavity 16c to seal the interface between second end closure 16 and housing wall 12c. End closure 16 may be stamped, die cast, or otherwise metal formed and may be made from carbon steel or stainless steel, for example.

Figure 4:
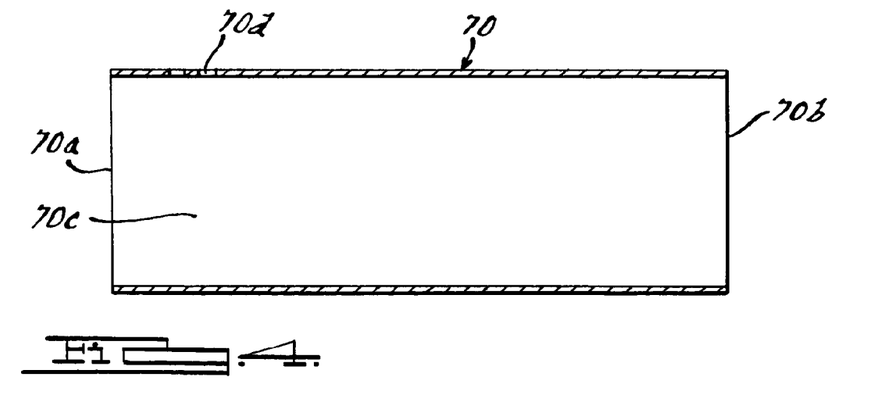
FIG. 4 is a cross-sectional side view of an inner housing incorporated into the gas generating system of FIG. 1.

Referring to FIGS. 1 and 4, a tubular inner housing 70 is radially inwardly spaced from outer housing 12 and is oriented coaxially with outer housing 12 along longitudinal axis L. Inner housing 70 has a body defining a first end 70a proximate first end 12a of outer housing 12, a second end 70b opposite first end 70a, and an interior cavity 70c for containing a quantity of a gas generant composition 50 therein. Inner housing 70 is provided with a plurality of gas exit apertures 70d formed therealong to enable fluid communication between an interior of inner housing 70 and an exterior of the inner housing. Inner housing 70 may be formed as known in the art and may, for example, be extruded or roll formed from sheet metal and then perforated to produce apertures 70d.

Figures 5, 6, 7:
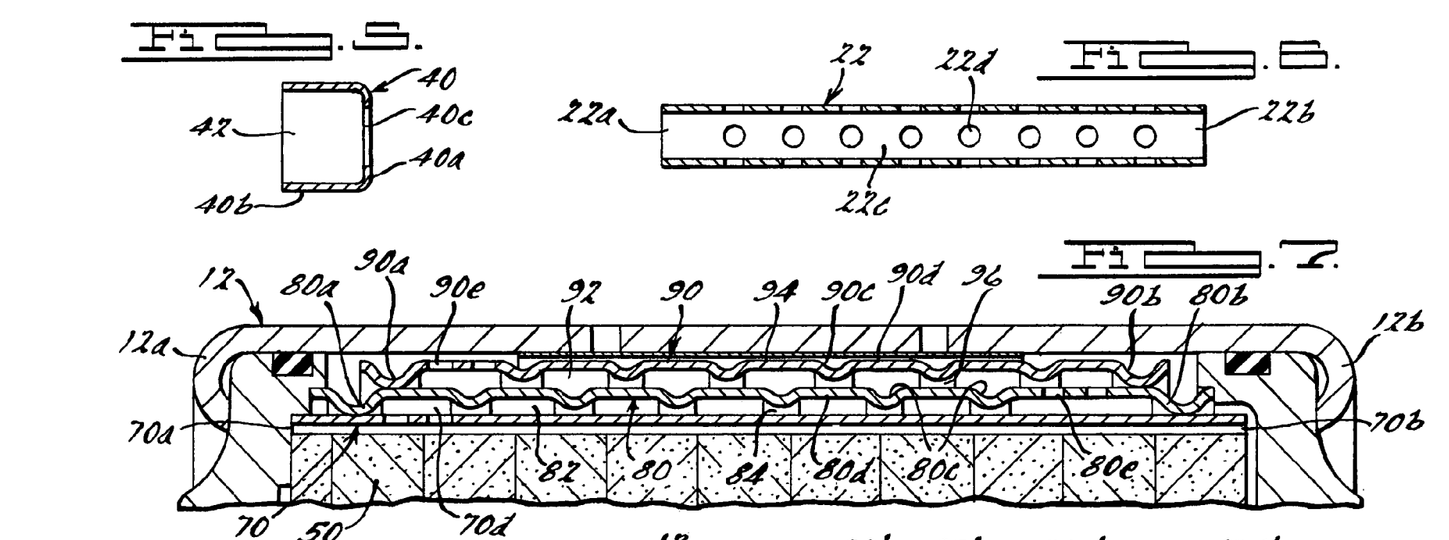
FIG. 5 is a cross-sectional side view of an ignition cup incorporated into the gas generating system of FIG. 1.
FIG. 6 is a cross-sectional side view of an ignition tube incorporated into the gas generating system of FIG. 1.
FIG. 7 is an enlarged partial view of the cross-section of FIG. 1.

Referring to FIGS. 1 and 5, an ignition cup 40 is positioned adjacent first end closure 14. Ignition cup 40 has a base portion 40a and an annular wall 40b extending from the base portion to abut first end closure 14 along recessed central area 14e (FIG. 2). Base portion 40a, wall 40b, and first end closure 14 define a cavity 42 for containing booster propellant or ignition compound 44 therein. At least one ignition gas exit orifice 40c is formed in ignition cup 40 for release of ignition compound combustion products once ignition compound 44 is ignited. In the embodiment shown in FIGS. 1 and 5, an orifice 40c is formed in base portion 40a. Wall 40b may be secured in position along first end closure central portion 14e using an interference fit or other known methods. Ignition cup 40 may be stamped, die cast, or otherwise metal formed and may be made from carbon steel or stainless steel, for example.

Referring again to FIG. 1, a quantity of a booster propellant or ignition compound 44 is contained within ignition cup cavity 42. In the embodiment shown in FIG. 1, ignition compound 44 is a known or suitable ignition or booster compound, whose combustion ignites a main gas generant charge 50 (described in greater detail below) positioned within inner housing 70 in a manner well-known in the art.

Referring to FIGS. 1 and 2, an igniter assembly 52 is positioned and secured within first end closure central orifice 14b so as to enable fluid communication with cavity 42 containing ignition compound 44. An igniter 54 is incorporated into the igniter assembly for igniting the ignition compound 44 upon activation of the gas generating system. Igniter assembly 52 may be secured in central orifice 14b using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products bv, of The Netherlands. Igniter 54 may be formed as known in the art. Exemplary igniter constructions are described in U.S. Pat. Nos. 6,009,809 and 5,934,705, incorporated herein by reference. Igniter 54 may be secured within igniter assembly 52 by any one of a variety of methods, for instance using welds, adhesives, by crimping, or by integrally molding the igniter into a portion of the igniter assembly.

Referring to FIGS. 1 and 6, a longitudinal gas generant ignition tube 22 is radially inwardly spaced from inner housing 12 and is coaxially oriented along longitudinal axis L. Ignition tube 22 has a substantially cylindrical body defining a first end 22a proximate end 12a of housing 12, a second end 22b opposite first end 22a, and an interior cavity 22c. Ignition tube first end 22a extends into orifice 40c formed in ignition cup 40 to enable fluid communication between igniter 54 (FIG. 2) and ignition tube interior cavity 22c. Ignition tube 22 extends along longitudinal axis L from housing end 14 toward housing end 16 and is provided with a plurality of gas exit apertures 22d formed therealong to facilitate dispersal of ignition products including gas, solids, and flame produced by the ignition of igniter 54 and the combustion of ignition compound 44, in a manner known in the art. The ignition products are dispersed through gas exit apertures 22d to ignite gas generant composition 50 positioned along the interior of inner housing 70. Ignition tube 22 may be formed as known in the art, and may, for example, be extruded or roll formed from sheet metal and then perforated to produce apertures 22d. Apertures 22d may be environmentally sealed with an aluminum tape (not shown) or any other effective seal prior to activation of the gas generating system.

Referring again to FIG. 1, a quantity of a gas generant composition 50 is positioned within inner housing 70. In the embodiment shown in FIG. 1, gas generant 50 is in the form of a series of annular wafers stacked along inner housing 70. Ignition tube 22 extends through openings formed in wafers 50 to enable fluid communication between interior cavity 22c of ignition tube and gas generant 50 to facilitate ignition of the gas generant upon activation of igniter 54, in a manner described in greater detail below. Gas generant wafers 50 may be formed from any known gas generant composition useful for airbag application and is exemplified by, but not limited to, compositions and processes described in U.S. Pat. Nos. 5,035,757, 5,872,329, 6,074,502, 6,210,505, or 6,620,266, all herein incorporated by reference.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Materials which function as high-temperature slag formers have melting points at, or higher, than the combustion temperature or decompose into compounds which have melting points, at or higher, than the combustion temperature. The alkaline earth oxides, hydroxides and oxalates are useful high-temperature slag formers. Magnesium carbonate and magnesium hydroxide are very useful high-temperature slag formers because they decompose before melting to form magnesium oxide which has a very high melting point (2800° C.). As mentioned above, oxidizers such as strontium nitrate are especially beneficial since they serve both as high-temperature slag former and oxidizer, thereby increasing the amount of gas produced per unit weight.

Metal salts as fuels, such as the calcium or strontium salt of 5-aminotetrazole, tetrazole, or ditetrazole are also useful high-temperature slag formers, although not as efficient as the oxidizers. Other metal oxides having high melting points such as the oxides of titanium, zirconium and cerium are also useful high-temperature slag formers.

Materials which function as low-temperature slag formers have melting points at or below the combustion temperature or form compounds during combustion which have melting points at or below the combustion temperature. Compounds such as silicon dioxide ($SiO_2$), boric oxide ($B_2O_3$), vanadium pentoxide ($V_2O_5$), sodium silicate ($Na_2SiO_3$), potassium silicate ($K_2SiO_3$), sodium carbonate ($Na_2CO_3$) and potassium carbonate ($K_2CO_3$) are examples of low-temperature slag formers.

It should be noted that either the oxidizer or the fuel can act as a low-temperature slag former if it contains a suitable substance which can be converted during combustion. For example, sodium nitrate or the sodium salt of tetrazole, during the combustion reactions, can convert to sodium carbonate or sodium silicate, if silicon dioxide is also present.

Set in the above context, the pyrotechnic, slag forming gas generating mixture disclosed in U.S. Pat. No. 5,037,757 comprises at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchlorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates; perchlorates or chlorates or from the group consisting of alkali metal salts of tetrazoles, bitetrazoles and triazoles or from the group consisting of the various naturally occurring clays and talcs.

In practice, certain of the materials may be substituted or interchanged. Specifically, both the fuel and the high-temperature slag forming material may be selected from the group consisting of alkaline earth metal salts of tetrazoles, bitetrazoles and triazoles. Both the oxygen containing oxidizer compound and high-temperature slag forming material may be comprised of one or more of the group consisting of alkaline earth metal and lanthanide nitrates, perchlorates, chlorates and peroxides. Both the fuel and the low-temperature slag forming material may comprise one or more of the group consisting of alkali metal salts of tetrazoles, bitetrazoles and triazoles. Both the oxygen containing oxidizer compound and the low-temperature slag forming material may comprise one or more of the group consisting of alkali metal nitrates, perchlorates, chlorates and peroxides.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight, and said low-temperature slag former is silicon dioxide which is present in a concentration of about 2 to about 18% by weight.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, is selected from the group consisting of amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen subsituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Preferred high nitrogen nonazides employed as primary fuels in gas generant compositions include, in particular, amine salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH.sub.3), diammonium salt of 5,5'-bis-1H-tetrazole ($BHT.2NH_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), diguanidinium salt of 5,5'-Azobis-1H-tetrazole (ABHT-2GAD), and monoammonium salt of 5-Nitramino-1H-tetrazole ($NAT-1NH_3$). The nonazide fuel generally comprises 15-65%, and preferably comprises 20-55%, by weight of the total gas generant composition.

The foregoing amine salts of tetrazole or triazole are dry-mixed with phase stabilized ammonium nitrate. The oxidizer is generally employed in a concentration of about 35 to 85% by weight of the total gas generant composition. The ammonium nitrate is stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1-10% of the gas generant composition, wherein toxic effluents generated upon combustion are minimized. Other known gas generant constituents may be included within the gas generant composition to vary the performance of the gas generant.

Referring again to FIG. 1, an annular washer-like, pad cushion 74 formed from, for example, a ceramic fiber material is provided for holding the gas generant wafers 50 in place and for cushioning the gas generant wafers against vibration and impact.

Referring to FIG. 1, the gas generating system of the present invention incorporates a baffle system for cooling and regulating the flow of gas, and for inhibiting the propagation of the flame front resulting from combustion of gas generant composition 50. In a first embodiment, shown in FIGS. 1 and 7, the baffle system includes a first tubular baffle 80 having a first end 80a, a second end 80b, and a plurality of corrugations 80c formed along the baffle between the first and second ends. First baffle 80 is positioned between inner housing 70 and outer housing 12 to define a first gas flow channel 82 extending between the first baffle and inner housing 70.

Corrugations 80c are spaced apart from inner housing 70 to provide a corresponding plurality of constricted gas flow passages 84 extending between corrugations 80c and inner housing 70. Constructed flow passages 84 provide-alternating compression and expansion of gases flowing along first gas flow channel 82. In the embodiment shown in FIGS. 1 and 7, a non-corrugated baffle section 80d is positioned between each pair of adjacent corrugations 80c and corrugations 80c are oriented substantially perpendicularly to outer housing longitudinal axis L. First baffle 80 may be formed from a sheet metal material, such as steel or aluminum.

In the embodiment shown in FIGS. 1 and 7, first end 80a of first baffle 80 is attached to an outer surface of inner housing first end 70a by, for example, a circumferential weld or an applied adhesive extending around the outer surface of the inner housing to form a substantially gas-tight seal between first baffle 80 and inner housing 70.

Similarly, second end 80b of first baffle 80 is attached to an outer surface of inner housing second end 70b by, for example, a circumferential weld or an applied adhesive extending around the outer surface of the inner housing to form a substantially gas-tight seal between first baffle 80 and inner housing 70. It is believed that direct attachment of the ends of first baffle 80 to corresponding ends of inner housing 70 enables greater control of the spacing between corrugations 80c and the outer surface of inner housing 70. Other suitable methods may be used for attaching first baffle 80 to inner housing 70, provided the method used is capable of forming and retaining the gas-tight seal. Alternatively, first end 80a and second end 80b of first baffle 80 may simply be positioned within recessed central portions 14e and 16e of first and second end closures 14 and 16, respectively. Edges of ends 80a and 80b of first baffle 80 abut corresponding ones of end closures 14 and 16 so as to form a substantially gas-tight seal when the end closures are positioned within outer housing 12 and outer housing ends 12a and 12b are crimped over end closures 14 and 16.

First baffle 80 also includes an opening formed therein to enable fluid communication between gas flow channel 84 and an exterior of the gas flow channel. In the embodiment shown in FIGS. 1 and 7, where a continuous gas tight seal extends around the outer surface of inner housing 70 at each end of first baffle 80, the first baffle includes one or more apertures 80e formed therealong to enable fluid communication between gas flow channel 82 and an exterior of the gas flow channel.

Also, in the embodiment shown in FIGS. 1 and 7, a second tubular baffle 90 is positioned between first baffle 80 and outer housing 12. Second baffle 90 is also attached to first baffle 80. Second baffle 90 has a first end 90a and a second end 90b. The incorporation of second baffle 90 into the gas generating system forms a gas flow channel 92 extending between first baffle 80 and second baffle 90, and a gas flow channel 94 extending between second baffle 90 and outer housing 12.

First end 90a of second baffle 90 is attached to an outer surface of first baffle first end 80a by, for example, a circumferential weld or an applied adhesive extending around the outer surface of the first baffle to form a substantially gas-tight seal between first baffle 80 and second baffle 90. Similarly, second end 90b of second baffle 90 is attached to an outer surface of first baffle second end 80b by, for example, a circumferential weld or an applied adhesive extending around the outer surface of the first baffle to form a substantially gas-tight seal between first baffle 80 and second baffle 90. Second baffle 90 also includes one or more apertures 90e formed therealong to enable fluid communication between first baffle 80 and outer housing 12. Second baffle 90 may be formed from a sheet metal material, such as steel or aluminum.

In the embodiment shown in FIGS. 1 and 7, second baffle 90 also has a plurality of corrugations 90c formed therealong, similar to corrugations 80c formed along first baffle 80. Second baffle 90 also includes a non-corrugated baffle section 90d positioned between each pair of adjacent corrugations 90c, as seen in first baffle 80c. However, it is contemplated that second baffle 90 may alternatively have a surface without any corrugations. In addition, as seen in FIGS. 1 and 7, each corrugation 90c along second baffle 90 is spaced apart from a corresponding substantially non-corrugated baffle section 80d along first baffle 80 so as to provide a constricted gas flow passage 96 extending between each second baffle corrugation 90c and a corresponding non-corrugated first baffle section 80d. Corrugations 80c may be formed by a known method (for example, by forming a tube using roll-forming or extrusion, then pressing the corrugations into the wall of the finished tube.)

Figure 8:
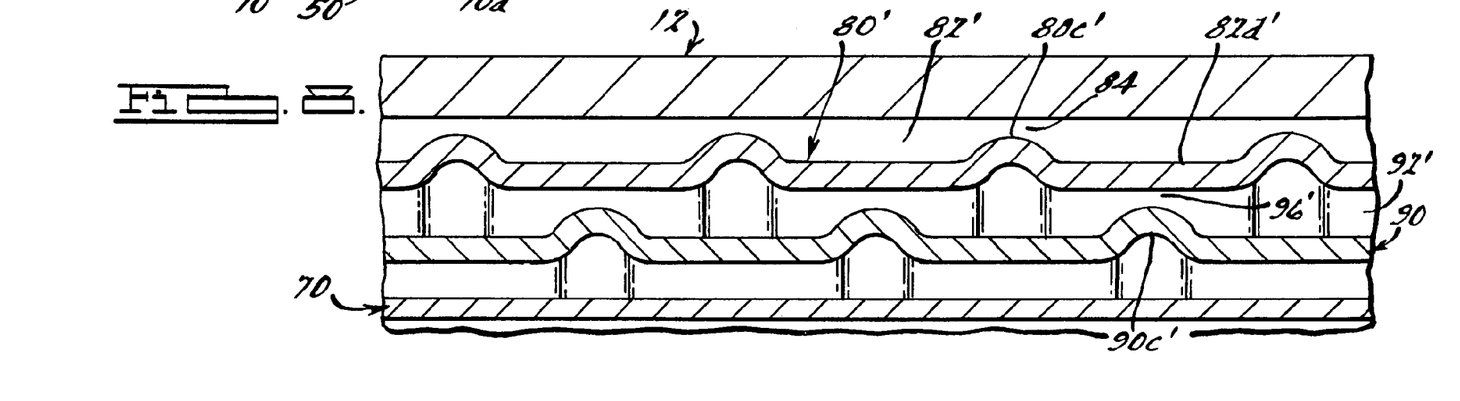
FIGS. 8-13 are partial cross-sectional side views of baffle systems in accordance with various alternative embodiments of the gas generating system.

In an alternative embodiment (shown in FIG. 8), a first baffle 80' defines a first gas flow channel 82' extending between the first baffle and outer housing 12. In this embodiment, corrugations 80c' are spaced apart from outer housing 12 to provide a corresponding plurality of constricted gas flow passages 84' extending between corrugations 80c' and outer housing 12. A corrugated second baffle 90' (similar to baffle 90 previously described) is positioned between first baffle 80' and inner housing 70 to form a gas flow passage 92' between first baffle 80' and second baffle 90'. Corrugations 90c are spaced apart from straight portions 80d' of baffle 80' to provide a corresponding plurality of constricted gas flow passages 96' extending between corrugations 90c' and first baffle 80', as previously described. Constricted flow passages 96' provide alternating compression and expansion of gases flowing along first gas flow channel 92'.

Figure 9:
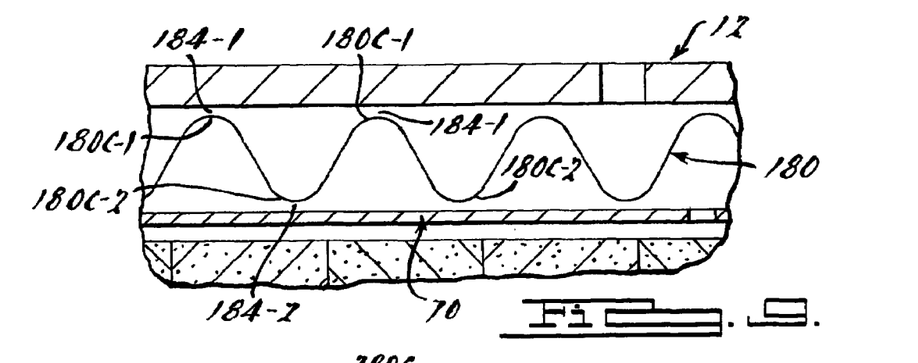

Referring to FIG. 9, in a particular embodiment of the baffle system, first ones 180c-1 of the corrugations are spaced apart from outer housing 12 to provide corresponding first ones 184-1 of the constricted gas flow passages extending between corrugations 180c-1 and outer housing 12. Similarly, second ones 180c-2 of corrugations 180c are spaced apart from inner housing 70 to provide corresponding second ones 184-2 of constricted gas flow passages 184 extending between corrugations 180c-2 and inner housing 70. Corrugations 180c-1 and 180c-2 may be formed adjacent each other in alternating fashion as shown in FIG. 9 such that first baffle 180 has a substantially sinusoidal cross-section.

Figure 10:
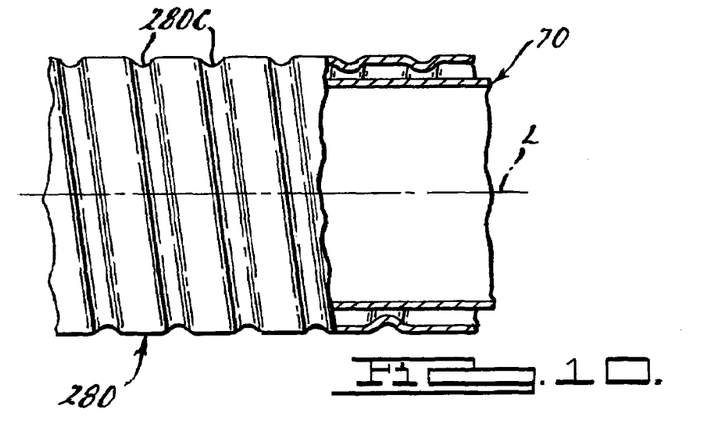

In another alternative embodiment (shown in FIG. 10), corrugations 280c extend helically along a first baffle 280 and about longitudinal axis L. In this embodiment, gases are directed along an inner surface of the baffle in a helical fashion, as well as being directed through constructed flow passages formed between corrugations 280c and inner housing 70. This increases the baffle surface area over which at least a portion of the gases pass, thereby enhancing the cooling effects of the baffle.

Figure 11:
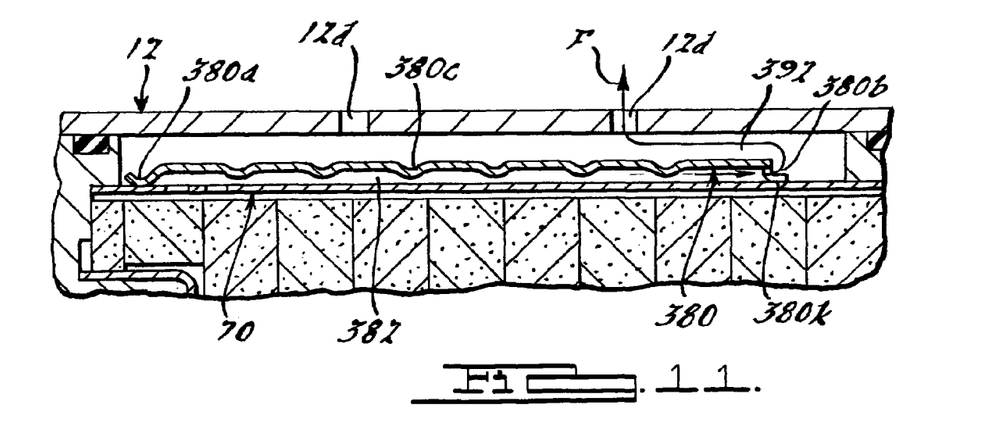

Referring to FIG. 11, in yet another alternative embodiment, an opening in first baffle 380 enabling fluid communication between a gas flow channel 382 and an exterior of the gas flow channel comprises an open end 380b of first baffle 380. More specifically, a first end 380a of a first baffle 380 abuts or is secured to inner housing 70 or to first end closure 14, effectively closing the first end of the baffle. At the same time, an opposite end 380b of first baffle 380 remains open, permitting gases to flow out the end of the baffle. The gases then flow into an annular chamber extending between first baffle 380 and outer housing 12, toward gas exit orifices 12d in outer housing 12, along a path indicated by arrow F of FIG. 11. In this embodiment, spacing of first baffle corrugations 380c with respect to the outer surface of inner housing 70 is provided by portions of baffle second end 380b which are cut and/or shaped to provide a series of spacers 380k formed about baffle second end 380b. Spacers 300 comprise localized deformations of the baffle material spaced around baffle second end 380b which are individually secured to the outer surface of inner housing 70, for example by welding. Thus, gases flowing axially from baffle first end 380a toward baffle second end 380b are free to exit flow channel 382 through baffle second end 380b by flowing around the spacers. As the end of the baffle is left open, this embodiment obviates the need to form apertures along the baffle for fluid communication between flow channel 382 and outer housing orifices 12d. In addition, other methods for spacing apart and securing baffle 380 from inner housing 70 are also contemplated.

Figure 12:
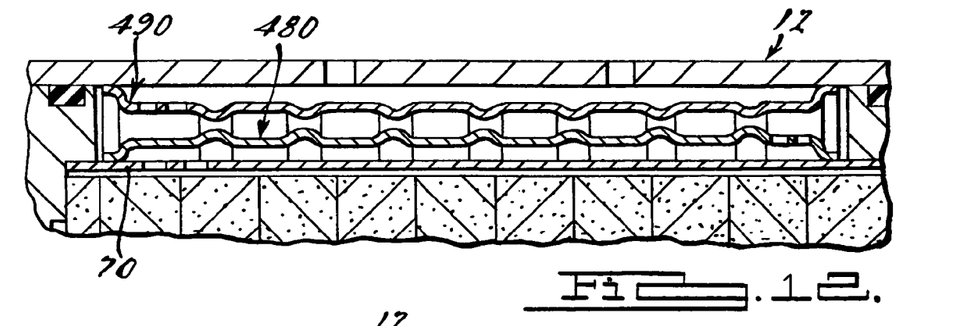

In an additional alternative embodiment (not shown), rather than being directly attached to the first baffle, the first end and second end of the second baffle are simply positioned within recessed central portions 14e and 16e of first and second end closures 14 and 16, respectively, as described above with respect to first baffle 80. In yet another embodiment, shown in FIG. 12, second baffle 490 is directly attached to outer housing 12 rather than to first baffle 480.

Figure 13:
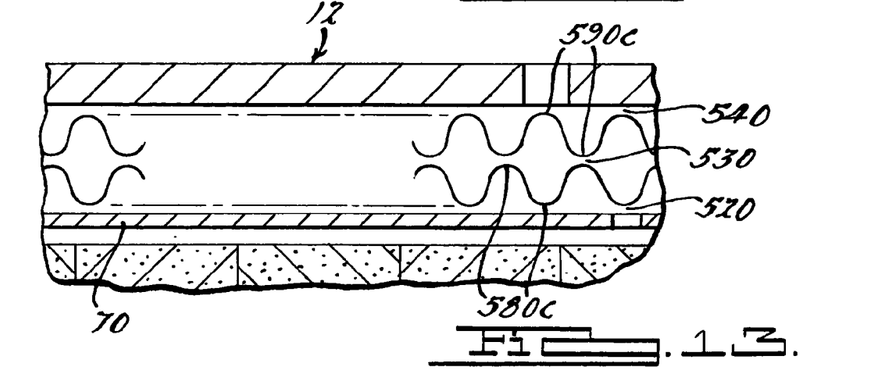

Referring to FIG. 13, in yet another alternative embodiment of the gas generating system incorporating two baffles, corrugations 590c formed along second baffle 590 are spaced apart from corresponding corrugations 580c formed along first baffle 580 so as to define a series of constricted gas flow passages (520, 530, 540) extending between second baffle corrugations 590c and corresponding first baffle corrugations 580c. This embodiment provides three sets of constricted flow paths for the generated gas.

Operation of the gas generator will now be discussed with reference to the drawings.

Upon receipt of a signal from a crash sensor, an electrical activation signal is sent to igniter 54. Combustion products from the igniter expand into cavity 42, igniting booster compound 44 positioned in cavity 42. Products from the combustion of booster compound 44 proceed out of cavity 42 through ignition cup orifice 40c and flow along ignition tube interior cavity 22c, exiting the ignition tube through gas exit apertures 22d to ignite gas generant composition 50. Products from the combustion of gas generant 50 exit inner housing 70 through apertures 70d (FIG. 6), and then flow axially along first gas flow channel 82 (FIG. 7), exiting the first flow channel into flow channel 92 (between first baffle and second baffle) through apertures 80e formed in first baffle 80. The combustion products then flow axially in an opposite direction, back toward housing first end 12a. The gases then exit flow channel 92 through apertures 90e formed in second baffle 90 and proceed toward apertures 12d formed along outer housing 12, through which the products exit the gas generating system into an associated inflatable device (not shown), such as a vehicle airbag. The combustion products are alternately compressed and expanded as they flow through and between constricted passages 84 and 96 formed by the baffles 80 and 90 and housings 70 and 12, thereby facilitating cooling and filtration of the combustion products.

Figure 14:
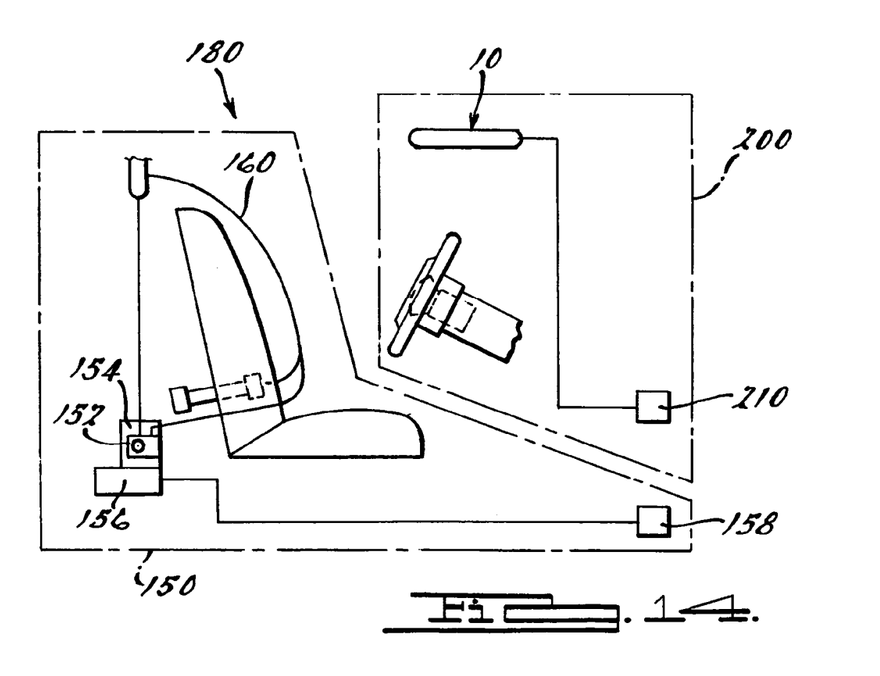
FIG. 14 is a schematic representation of a vehicle occupant restraint system incorporating a gas generating system in accordance with the present invention.

Referring to FIG. 14, in a particular application, a gas generating system 10 in accordance with the present invention is incorporated into an airbag system 200. Airbag system 200 includes at least one airbag (not shown) and a gas generating system 10 as described herein coupled to the airbag so as to enable fluid communication with an interior of the airbag. Airbag system 200 may also be in communication with a known crash event sensor 210 that is in operative communication with a known crash sensor algorithm (not shown) which signals actuation of airbag system 200 via, for example, activation of gas generating system igniter 54 (FIG. 2) in the event of a collision.

Referring again to FIG. 14, an embodiment of the gas generating system or an airbag system including an embodiment of the gas generating system may be incorporated into a broader, more comprehensive vehicle occupant protection system 180. For example, vehicle occupant protection system 180 may include elements such as a safety belt assembly 150. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be emphasized that the present invention contemplates systems incorporating the above-described gas generating system to include vehicle occupant protection systems. It should further be emphasized that the present invention is believed suitable for use in various types of protection systems, including driver-side, passenger side, and head curtain airbag inflation systems. Accordingly, vehicle occupant protection systems constructed in a known manner and yet incorporating the gas generating system described herein are within the scope of the present invention.

It will be appreciated that the various constituents described above are formed in known manners. For example, the baffles and various other components may be molded, stamped or otherwise metal formed from steel, aluminum, metallic alloys, or polymeric equivalents. It will also be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A gas generating system comprising:
a tubular outer housing having a longitudinal axis and at least one aperture formed therealong to enable fluid communication between an interior of the outer housing and an exterior of the outer housing;
a tubular inner housing positioned within the interior of the outer housing, the inner housing including at least one aperture formed therealong to enable fluid communication between an interior of the inner housing and an exterior of the inner housing;
a first tubular baffle having a plurality of corrugations formed therealong, the first baffle being positioned between the inner housing and the outer housing to define a first gas flow channel extending between the first baffle and at least one of the outer housing and the inner housing, the first tubular baffle also having an opening formed therein to enable fluid communication between the first gas flow channel and an exterior of the first gas flow channel, the plurality of corrugations being spaced apart from the at least one of the outer housing and the inner housing to provide a corresponding plurality of constricted gas flow passages extending between the corrugations and the at least one of the inner housing and the outer housing, to provide alternating compression and expansion of gases flowing along the gas flow channel.

2. The gas generating system of claim 1 wherein first ones of the plurality of corrugations are spaced apart from the outer housing to provide corresponding first ones of the plurality of constricted gas flow passages extending between the corrugations and the outer housing, and second ones of the plurality of corrugations are spaced apart from the inner housing to provide corresponding second ones of the plurality of constricted gas flow passages extending between the corrugations and the inner housing.

3. The gas generating system of claim 1 wherein the plurality of corrugations is oriented substantially perpendicularly to the outer housing longitudinal axis.

4. The gas generating system of claim 3 wherein the second baffle includes an opening formed therein to enable fluid communication between the first baffle and the outer housing.

5. The gas generating system of claim 1 wherein the plurality of corrugations extend helically along the baffle and about the outer housing longitudinal axis.

6. The gas generating system of claim 1 wherein the first baffle is attached to the at least one of the inner housing and the outer housing.

7. The gas generating system of claim 1 wherein the first gas flow channel extends between the first baffle and the inner housing, and wherein the gas generating system further comprises a second tubular baffle positioned between the first baffle and the outer housing.

8. The gas generating system of claim 7 wherein the second baffle is attached to at least one of the first baffle and the outer housing.

9. The gas generating system of claim 7 wherein the first baffle further comprises a substantially non-corrugated baffle section positioned between each corrugation of the plurality of corrugations and an adjacent corrugation of the plurality of adjacent corrugations.

10. The gas generating system of claim 7 wherein the second baffle has a plurality of corrugations formed therealong.

11. The gas generating system of claim 10 wherein the second baffle further comprises a substantially non-corrugated baffle section positioned between each corrugation of the plurality of corrugations and an adjacent corrugation of the plurality of adjacent corrugations.

12. The gas generating system of claim 11 wherein the first baffle further comprises a substantially non-corrugated baffle section positioned between each corrugation of the plurality of corrugations and an adjacent corrugation of the plurality of adjacent corrugations, and wherein each corrugation of the plurality of second baffle corrugations is spaced apart from a corresponding substantially non-corrugated baffle section on the first baffle so as to provide a constricted gas flow passage extending between the second baffle corrugation and the substantially non-corrugated baffle section.

13. The gas generating system of claim 10 wherein ones of the plurality of corrugations formed along the second baffle are spaced apart from corresponding ones of the plurality of corrugations formed along the first baffle so as to provide a plurality of constricted gas flow passages extending between the ones of the second baffle corrugations and the corresponding ones of the first baffle corrugations.

14. The gas generating system of claim 1 wherein the first gas flow channel extends between the first baffle and the outer housing, and wherein the gas generating system further comprises a second tubular baffle positioned between the first baffle and the inner housing.

15. The gas generating system of claim 1 wherein the corrugations of the plurality of corrugations are formed adjacent each other such that the first baffle has a substantially sinusoidal cross-section.

16. A gas generating system comprising:
a tubular outer housing having a longitudinal axis and at least one aperture formed therealong to enable fluid communication between an interior of the outer housing and an exterior of the outer housing;
a tubular inner housing positioned within the interior of the outer housing, the inner housing including at least one aperture formed therealong to enable fluid communication between an interior of the inner housing and an exterior of the inner housing;
a first tubular baffle having a plurality of corrugations formed therealong, the first baffle being positioned between the inner housing and the outer housing to define a first gas flow channel extending between the first baffle and the inner housing such that the plurality of corrugations is spaced apart from the inner housing to provide a corresponding plurality of constricted gas flow passages extending between the corrugations and the inner housing, to provide alternating compression and expansion of gases flowing along the gas flow channel, the first baffle further having a substantially non-corrugated baffle section positioned between each corrugation of the plurality of corrugations and an adjacent corrugation of the plurality of adjacent corrugations;
a second tubular baffle positioned between the first baffle and the outer housing, the second baffle being attached to the first baffle, the second baffle including at least one aperture formed therealong to enable fluid communication between the first baffle and the outer housing, the second baffle having a plurality of corrugations formed therealong, and a substantially non-corrugated baffle section positioned between each corrugation of the plurality of corrugations and an adjacent corrugation of the plurality of adjacent corrugations, each corrugation of the plurality of second baffle corrugations being spaced apart from a corresponding substantially non-corrugated baffle section on the first baffle so as to provide a constricted gas flow passage extending between the second baffle corrugation and the substantially non-corrugated baffle section.

17. A vehicle occupant protection system comprising:
an airbag system including an airbag and a gas generating system coupled to the airbag so as to enable fluid communication with the airbag upon activation of the airbag system, the gas generating system including:
a tubular outer housing having a longitudinal axis and at least one aperture formed therealong to enable fluid communication between an interior of the outer housing and an exterior of the outer housing;
a tubular inner housing positioned within the interior of the outer housing, the inner housing including at least one aperture formed therealong to enable fluid communication between an interior of the inner housing and an exterior of the inner housing;
a first tubular baffle having a plurality of corrugations formed therealong, the first baffle being positioned between the inner housing and the outer housing to define a first gas flow channel extending between the first baffle and at least one of the outer housing and the inner housing such that the plurality of corrugations is spaced apart from the at least one of the outer housing and the inner housing to provide a corresponding plurality of constricted gas flow passages extending between the corrugations and the at least one of the inner housing and the outer housing, to provide alternating compression and expansion of gases flowing along the gas flow channel.

18. The vehicle occupant protection system of claim 17 further comprising a crash event sensor in communication with a crash sensor algorithm for signaling activation of the airbag system.

19. The vehicle occupant protection system of claim 17 further comprising a safety belt assembly including at least one safety belt.

20. The gas generating system of claim 17 wherein the first baffle includes at least one aperture formed therealong to enable fluid communication between the gas flow channel and an exterior of the gas flow channel.

* * * * *